United States Patent
Balachandran et al.

(10) Patent No.: US 7,970,425 B2
(45) Date of Patent: Jun. 28, 2011

(54) PUSH-TO-TALK GROUP CALL SYSTEM USING CDMA 1X-EVDO CELLULAR NETWORK

(75) Inventors: Krishna Balachandran, Morganville, NJ (US); Kenneth C. Budka, Marlboro, NJ (US); Joseph H. Kang, Belle Mead, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1194 days.

(21) Appl. No.: 11/215,669

(22) Filed: Aug. 30, 2005

(65) Prior Publication Data

US 2007/0049314 A1 Mar. 1, 2007

(51) Int. Cl.
*H04B 7/00* (2006.01)
*H04H 20/71* (2008.01)
(52) U.S. Cl. .................. 455/519; 518/517; 518/3.01
(58) Field of Classification Search .............. 455/518, 455/519, 517, 521, 416
See application file for complete search history.

(56) References Cited

U.S. PATENT DOCUMENTS

| | | | | |
|---|---|---|---|---|
| 6,996,410 B2* | 2/2006 | Bos et al. | ...................... | 455/466 |
| 7,228,130 B1* | 6/2007 | Trandai et al. | ............. | 455/426.1 |
| 7,415,241 B2* | 8/2008 | Oprescu-Surcobe et al. | ............. | 455/3.05 |
| 7,437,170 B2* | 10/2008 | Dunn et al. | .................... | 455/518 |
| 7,623,880 B2* | 11/2009 | Sinnarajah et al. | ........... | 455/509 |
| 7,634,223 B2* | 12/2009 | Kelley et al. | ................. | 455/3.01 |
| 2003/0134651 A1* | 7/2003 | Hsu | .............................. | 455/509 |
| 2003/0194992 A1* | 10/2003 | Kim et al. | .................. | 455/414.1 |
| 2004/0087319 A1* | 5/2004 | Bos et al. | ....................... | 455/458 |
| 2004/0147274 A1* | 7/2004 | Khawand et al. | ............. | 455/522 |
| 2005/0043035 A1* | 2/2005 | Diesen et al. | ................. | 455/454 |
| 2005/0079867 A1* | 4/2005 | Balachandran et al. | ... | 455/435.1 |
| 2005/0090273 A1* | 4/2005 | Jin et al. | ........................ | 455/502 |
| 2005/0111394 A1* | 5/2005 | Jung et al. | ..................... | 370/312 |
| 2005/0128996 A1* | 6/2005 | Yoshida et al. | ................ | 370/349 |
| 2006/0105793 A1* | 5/2006 | Gutowski et al. | ............. | 455/518 |
| 2006/0116149 A1* | 6/2006 | Dunn et al. | .................... | 455/518 |
| 2007/0217387 A1* | 9/2007 | Choi et al. | .................... | 370/342 |
| 2007/0281722 A1* | 12/2007 | Gao | .............................. | 455/518 |

OTHER PUBLICATIONS

Jun Wang, et al. *Broadcast and Multicast Services in cdma2000* (IEEE Communications Magazine, Feb. 2004).

* cited by examiner

*Primary Examiner* — Tilahun Gesesse
(74) *Attorney, Agent, or Firm* — McCormick, Paulding & Huber LLP

(57) ABSTRACT

A push-to-talk ("PTT") group call system, for use as, e.g., a public safety wireless network, includes a CDMA-based 1x-EVDO radio access network operably connected to a PTT server over an IP network. The radio access network includes base stations for radio communications with a number of distributed mobile stations. In carrying out wireless communications, the group call system combines IP-based voice and other real-time multimedia services with the 1x-EVDO radio access network's Broadcast Multicast Service. This allows a number of users to receive the same copy of an IP-based media stream for point-to-multipoint, group transmissions. To reduce call setup times, the group call system uses "standing" call groups, which are ongoing group communication channels pre-established between the PTT server and authorized group users. Thus, mobile stations link to one or more standing call groups of interest upon power-up, prior to users speaking.

12 Claims, 9 Drawing Sheets

PUSH-TO-TALK GROUP CALL SYSTEM USING CDMA 1X-EVDO CELLULAR NETWORK

FIELD OF THE INVENTION

The present invention relates to communications and, more particularly, to wireless communications systems.

BACKGROUND OF THE INVENTION

Wireless, radio frequency communications systems enable people to communicate with one another over long distances without having to access landline-connected devices such as conventional telephones. Such capability is especially important when group activities have to be quickly coordinated, and possibly in dangerous situations or at locations where landline devices are disabled or unavailable. For example, wireless communication is heavily relied upon for livery dispatch, by emergency service agencies (e.g., police, fire, medical), and by the military. In the commercial cellular market, communications between users are primarily point-to-point in nature, e.g., a call is established between two mobile phones. In contrast, wireless communications in the public-safety and similar markets are primarily team or group based. There, a dispatcher talks to a large team in the field, and team members communicate amongst themselves. These markets are currently served using dedicated, private networks that utilize land mobile radio ("LMR") technologies such as "Project 25," deployed predominantly in North America, and terrestrial trunked radio ("TETRA"), deployed predominantly in Europe, the Middle East, and Asia. TETRA and Project 25 are both narrowband, digital wireless technologies that support voice and low speed data services. For example, the air interface in a second phase of Project 25 is designed to support four time-division multiplexed channels in 2×25 kHz, or two time-division multiplexed channels in 2×12.5 kHz. Each timeslot carries one voice bearer channel, or a data bearer channel with a peak rate of 9.6 kbit/s.

Because of the context and manner in which they are used, public-safety wireless networks necessarily differ from, e.g., commercial mobile phone networks in a number of ways. As mentioned above, public safety communication is primarily point-to-multipoint, where a dispatcher communicates with a large team in the field, and where members of a squad communicate with others in their squad—a so-called "talkgroup." Group calls are set up quickly, typically in less than 300 ms, as measured from the time a user hits the push-to-talk button on the handset (commonly called a "pressel") to the time a channel is granted for the user to start speaking. Additionally, audio propagation delays are low, typically less than 300 ms as measured from the time a user speaks to the time the voice signal is heard on recipient handsets. Public-safety networks also support multiple priority levels, and allow service preemption and queuing for network resources during periods of congestion. Preemptive priority levels are enforced end-to-end. Thus, a user making a priority group call request, for example, can cause the preemption of radio resources assigned to lower priority calls in its serving cell, if necessary, as well as the preemption of radio resources assigned to lower priority calls in the cells serving other group members. Preemptive priority calling features are used to deliver specialized supplemental services such as "man down" alerts.

Existing public-safety wireless networks are typically implemented as "conventional" systems and/or trunked systems. In conventional systems, users control the access to logical channels. Logical channels may be dedicated to specific purposes such as digital voice or data. Users wishing to use these dedicated, pre-provisioned channels manually configure their wireless devices (e.g., radios) for using the desired service. In trunked systems, access to a pool of logical channels is controlled by the network infrastructure. Logical channels are used to carry control messages to and from wireless devices as well as the digital voice and data bearer channels. Control processors allocate channels to users on request, and may give certain users priority over others. Because of the enhanced control features and enhanced spectral efficiencies achieved by trunked systems over conventional systems, trunked systems are being deployed to replace aging legacy conventional systems.

With reference to FIG. 1, a typical trunked public-safety wireless network 20 includes one or more base stations 22 ("BS") that support the wireless communications interface between the rest of the network 20 and various mobile stations 24, e.g., mobile phones and car-mounted radios. The base stations 22 transmit and receive the logical bearer channels for voice and data services, including transmitting control and system overhead messages for call setup, registration, and other call processing functions. The base stations 22 are connected to a central controller 26 that receives and processes service requests, and that controls the allocation of system resources, e.g., air interface channels, and wireline transmission facilities. For example, the central controller 26 may preempt existing calls to serve those with a higher priority, or queue requests when resources are unavailable. The central controller 26 may be connected to a gateway 28 for a public switched telephone network ("PSTN") 30, which allows the mobile stations 24 to access PSTN services such as originating and receiving PSTN calls, e.g., calls to public landline phones. Similarly, the central controller 26 may be connected to a data gateway 32 for access to circuit- and packet-switched data services or networks 34 such as the Internet.

Typically, public-safety networks 20 also include a system control computer 36, which serves as the operations, administration and maintenance interface for the central controller 26. The system control computer 36 also provides interfaces for configuration of user options (e.g., access to PSTN gateways, encryption), assignment of users to talkgroups, collection of performance monitoring data, and the like. Further, one or more dispatch consoles 38 may be connected to the central controller 26 through a switch 40, which acts as an interface between the consoles 38 and the central controller 26. The dispatch consoles 38 are computer interfaces used by dispatchers to communicate with the mobile stations 24. A call logging system 42 may be provided to store complete, time-stamped audio transcripts of calls, the identities of the devices involved in the call, or the like.

While existing public-safety wireless networks provide reliable, basic functionality for emergency service agencies and others in need of point-to-multipoint wireless communications, they are mostly appropriate for voice communications. Non-voice data transfer rates are relatively slow, meaning that most existing networks cannot be used for transmitting bandwidth intensive data such as streaming multimedia data or real-time data. The transmission of such information may be beneficial to emergency service and other agencies, e.g., transmitting interactive maps to personnel in the field, or transmitting video feeds from police or military operations. Also, this lack of capacity is contrary to commercial cellular networks, where the trend has been to develop systems with high data transfer rates for wireless Internet access or the like.

SUMMARY OF THE INVENTION

An embodiment of the present invention relates to a push-to-talk ("PTT") group call system for use as a wireless communications network having dispatch and group communication functionality. For example, the PTT group call system can be used as a public safety communications network that allows first responders and other personnel to receive calls from a central dispatch, and to make point-to-multipoint calls among established call groups. The group call system utilizes high-speed packet data transfer (e.g., voice over IP), allowing for the reliable and fast transmission of voice, non-voice, and multimedia data streams such as video.

The group call system utilizes a CDMA2000®-type (IS-2000) 1x-EVDO radio access network operably connected to a PTT application service network through one or more IP (Internet Protocol)-based networks. The radio access network has one or more fixed base stations for radio communications with a number of distributed mobile stations, e.g., vehicle-mounted radios (referred to as "mobiles") or ruggedized handsets (referred to as "portables"). The base stations are in turn interfaced with the IP network through one or more controllers, which act as the interface between the wireless/radio end of the radio access network and the IP network, including performing the signaling functions necessary to establish calls and other data transfer to and from the mobile stations. In carrying out wireless communications, the group call system combines IP-based voice (e.g., voice over IP) and other real-time multimedia services with the 1x-EVDO radio access network's Broadcast Multicast Service ("BCMCS"), which uses the "High Rate Broadcast Multicast Air Interface" protocol suite to deliver content. This suite allows an unlimited number of users to receive the same copy of an IP-based media stream (e.g., voice and data), for point-to-multipoint, group transmissions.

For group communications, users are divided into call groups (sometimes also referred to as "talkgroups"). By "call group," it is meant a group of users desiring to wirelessly communicate with one another in a point-to-multipoint manner, that is, the call group members all receive a speaking user's voice transmissions. To reduce call setup times and to provide the scale needed for mission-critical call groups, the group call system may use "standing" call groups. These are ongoing group communication/transmission channels pre-established between the PTT application service network and authorized call group users. Without loss of generality, "pre-established" channels may refer to physical or logical communication channels, in both cases established potentially well in advance of user communications (this is opposed to conventional wireless calls, were channels are established just prior to the transmission of voice or other user data). Thus, when a mobile station powers on, it communicates with the PTT application service network to join desired standing call groups. When joining, the mobile station is authenticated and provided with the parameters needed for receiving the forward link bearer (user data) and notification channels associated with the call group, as well as with various parameters that inform the mobile station how and where to send reverse link bearer and floor control requests. Pre-establishing calls in this manner provides quick response times upon the occurrence of a PTT event, e.g., when a user hits the pressel on a mobile station or other access terminal and is granted the floor by the PTT application service network. (By "floor," within the push-to-talk context of the present invention, it is meant temporary exclusive permission for a user to transmit voice or other data to the radio access network for retransmission to a group of other users, e.g., those in a call group.)

For communicating a user's desire to speak to the group once the user has joined a standing call group, the mobile station transmits appropriate control messages to the PTT application service network. Once the user is granted the floor, the user's voice or other data is transmitted to the radio access network and on to the PTT application service network. The data is in turn processed by the PTT application service network and routed back to the radio access network for transmission to the other mobile stations or access terminals in the call group as a BCMCS flow. (A "BCMCS flow" is a packet data stream transmitted according to BCMCS protocols/procedures.) The PTT application service network may transmit various control messages to inform call group members of when user data is being carried on their group channel.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
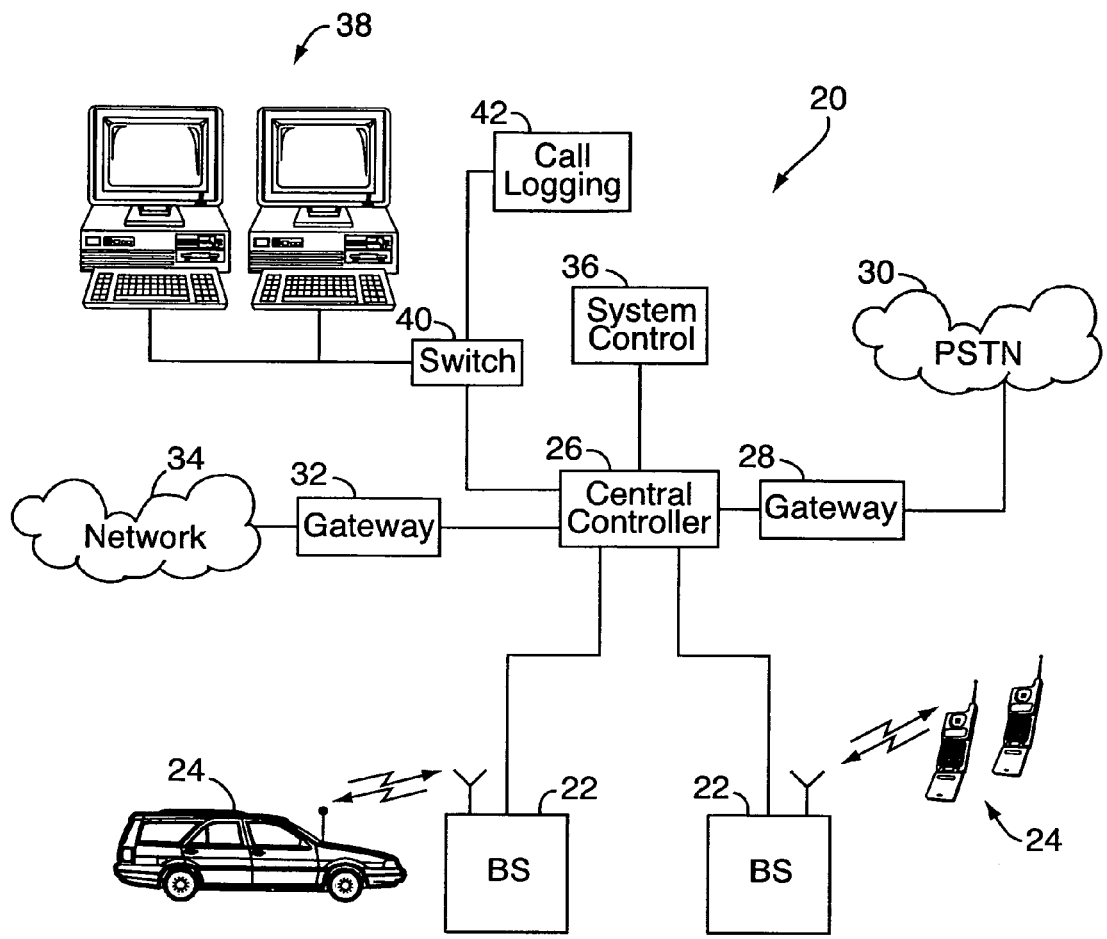
FIG. 1 is a schematic diagram of a prior-art public safety wireless network.

With reference to FIGS. 2-13, a push-to-talk ("PTT") group call system 50, for use, e.g., as a public safety wireless communications network, includes a CDMA-based 1x-EVDO radio access network 52 operably connected to a PTT application service network/infrastructure 54 through one or more IP (Internet Protocol)-based networks 56. The radio access network 52 has one or more fixed base stations 58 ("BS") each with various transceivers and antennae for radio communications with a number of distributed mobile stations, e.g., portables 60a and/or mobiles 60b. The base stations 58 are in turn interfaced with the IP network 56 through one or more controllers or control centers 62, which act as the interface between the wireless/radio end of the radio access network 52 and the IP or other networks 56, including performing the signaling functions necessary to establish calls and other data transfer to and from the mobile stations 60a, 60b. The controller 62 may be part of the base station equipment, or it may be a separate mobile switching center or the like that services a number of base stations. In carrying out wireless communications, the group call system 50 combines IP-based voice (e.g., voice over IP) and other real-time multimedia services with the 1x-EVDO radio access network's 52 "High Rate Broadcast Multicast Air Interface" protocol suite. This suite allows an unlimited number of users to receive the same copy of an IP-based media stream (e.g., voice and data), for point-to-multipoint, group transmissions.

For conducting wireless communications between base stations 58 and mobile stations 60a, 60b, the radio access network 52 utilizes a CDMA (code division multiple access) spread-spectrum multiplexing scheme. In CDMA-based networks, transmissions from the mobile stations 60a, 60b to the base stations 58 are across a single frequency bandwidth known as the reverse link, e.g., a 1.25 MHz bandwidth centered at a first designated frequency. Generally, each mobile station 60a, 60b is allocated the entire bandwidth all of the time, with the signals from individual mobile stations being differentiated from one another using an encoding scheme. Transmissions from the base stations 58 to the mobile stations 60a, 60b are across a similar frequency bandwidth (e.g., 1.25 MHz centered at a second designated frequency) known as the forward link. The forward and reverse links may each comprise a number of traffic channels and signaling or control channels, the former primarily for carrying data, and the latter primarily for carrying the control, synchronization, and other signals required for implementing CDMA communications. The radio access network 52 may be geographically divided into contiguous cells, each serviced by a base station, and/or into sectors, which are portions of a cell typically serviced by different antennae/receivers supported on a single base station.

As noted, the radio access network 52 is a CDMA-based 1x-EVDO wireless communications network. More specifically, the network 52 uses the CDMA2000® "3-G" (third generation) mobile telecommunications protocol/specification for the high-speed wireless transmission of both voice and non-voice data. An implementation of CDMA2000® known as "1x-EVDO" (Evolution Data Optimized) supports high data rates, specifically, forward link data rates up to 3.1 Mbit/s, and reverse link rates up to 1.8 Mbit/s in a radio channel dedicated to carrying high-speed packet data. While the present invention is illustrated herein as implemented using a CDMA-based, 1x-EVDO network, it could also be implemented with other wireless networks that provide similar functionality. For example, the CDMA2000® 1x-EVDV (Evolution Data and Voice) standard could be a viable platform for use in the group call system 50, as could other standards. The radio access network 52 may be a dedicated network erected specifically for use as part of the group call system 50. Alternatively, it may be an existing cellular network that is also used for, e.g., commercial public mobile phone communications. In such a case, the functionality/components of the group call system 50 would be integrated with, and/or deployed "in parallel" to, the radio access network's existing infrastructure.

The group call system 50 will typically utilize the Internet Protocol ("IP") for data transmission generally, and voice over IP ("VoIP") for voice-data transmission. For transmitting data using the Internet Protocol, data is broken into a plurality of addressed data packets. With VoIP, analog audio signals are captured, digitized, and broken into packets like non-voice data. The data packets (both voice and non-voice) are then transmitted and routed over an IP-based computer network, where they are received and reassembled by the computer or other terminal to which the data packets were addressed. In the group call system 50, data is transmitted across the IP network 56, which is representative of one or more private or public IP-based computer networks, e.g., the Internet, that are operationally interconnected to one another in a standard manner. The radio access network 52 is used to provide the delivery of real-time IP media/data streams between the mobile stations 60a, 60b and the PTT application service network 54. The radio access network 52 also provides wireless connectivity between VoIP client software running on the mobile stations 60a, 60b and the PTT application service network 54. For delivering voice services over the 1x-EVDO air interface, the radio access network 52 supports conversational "QoS" (quality of service) classes. If voice and data services are supported on the same carrier, support of streaming (e.g., for delivery of video feeds), interactive (e.g., for web browsing service), and background (best-effort) QoS classes will be required in order to meet the requirements of different real-time and non-real time applications. The radio access network 52 also supports 1x-EVDO's High Rate Broadcast Multicast Packet Data Air Interface protocol suite. This protocol suite is used to deliver downlink multicast IP streams associated with broadcast and group voice calls, and to deliver multicast IP streams from data applications (e.g., maps, text streams) and other multimedia applications (e.g., video streams).

The PTT application service network 54 is a grouping of interconnected computers and/or software programs connected to the IP network 56. The PTT application service network 54 provides the support structure for carrying out IP-based communications amongst the mobile stations 60a, 60b, and/or between the mobile stations and one or more landline-based communications stations, e.g., a dispatch console 64, through the IP network 56. The dispatch consoles 64 are the computer interfaces used by dispatchers to communicate with wireless users. The PTT application service network 54 may include one or more of the following components: a PTT server computer 66 for transmitting and receiving IP-based data across the IP network 56, and for file storage and the like; an authentication, authorization, and accounting ("AAA") module 68; and a media duplicator 72 for duplicating and transmitting audio packets to all mobile stations and other access terminals listening to a PTT or group call. A group management database 70 may also be provided for establishing and regulating call groups, including allowing wireline and wireless users to form ad hoc push-to-talk group calls and communicate among users in predefined call groups (e.g., groups used for dispatch, squad communication, and the like). The PTT application service network 54 may provide supplementary services such as authentication, presence management, talking party identification, application layer encryption, etc.

The PTT application service network 54 is accessible by any access terminals having IP-connectivity. That is, the PTT server 66 will be provided with an IP address, in a standard manner, for transmitting and receiving data over the IP network 56 from terminals similarly outfitted. The dispatch consoles 64, for example, can be implemented as PTT clients that access the PTT server 66 via a wireline or other IP network 56. (By "client," it is meant a device or portion thereof, e.g., a client software program, configured to receive data from the PTT application service network 54.) Also, one or more call logging devices 74 may be implemented as PTT clients with "listen-only" permission.

As noted, the group call system 50 may be used in a number of different situations where PTT group communication is required. For example, the group call system 50 may be used as a public-safety wireless communications network. For implementing services specific to the particular application, the features provided by the 1x-EVDO radio access network 52 (e.g., support of end-to-end preemptive priorities, use of the High Rate Broadcast Multicast Air Interface) are combined with application layer software resident on the mobile stations 60a, 60b and wire line servers/clients 64, 66. For a public safety network, such services might include discreet listening and radio unit monitoring.

The High Rate Broadcast Multicast Packet Data Air Interface allows multiple mobile stations 60a, 60b to receive the same copy of a forward link IP data packet stream. CDMA2000®'s Broadcast Multicast Service ("BCMCS"), which uses the High Rate Broadcast Multicast Packet Data Air Interface to deliver content, provides additional functionality: authenticating users wishing to receive content, managing encryption keys, encrypting content, generating billing records, content management functions, and the like. Unlike 1x-EVDO's forward-link point-to-point traffic channels in which associated reverse link channels provide various acknowledgements and ongoing forward link channel quality feedback (as is typically the case in transmissions between a base station and mobile station in a CDMA network), there is no reverse link channel associated with the High Rate Broadcast Multicast Packet Data Air Interface. To allow an unlimited number of mobile stations 60a, 60b to receive a forward link data transmission or stream, the High Rate Broadcast Multicast Packet Data Air Interface provides unacknowledged delivery of packet data streams. Forward error correction provided by the broadcast medium access control ("Broadcast MAC") protocol gives an additional layer of protection against channel errors.

The Broadcast MAC protocol formats data for delivery over the air interface as a series of fixed-length error control blocks. To protect against airlink errors, each error control block is protected with a Reed-Solomon outer code. Several different Reed-Solomon codes are defined, each providing different levels of protection against airlink errors. The variety of outer codes available at the Broadcast MAC Protocol layer give the base stations 58 flexibility in setting decoding delay (use of large MAC error control blocks provides enhanced error protection through time diversity at the cost of higher reception delay) and parity. An additional layer of flexibility and robustness is provided in the selection of the physical layer channel rates used to deliver error control blocks to users.

Figure 3:
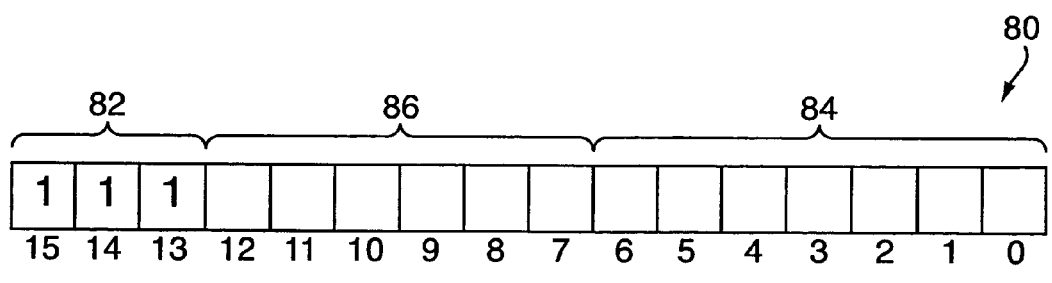
FIG. 3 is schematic diagram of a broadcast multicast service flow identifier.
Figure 2:
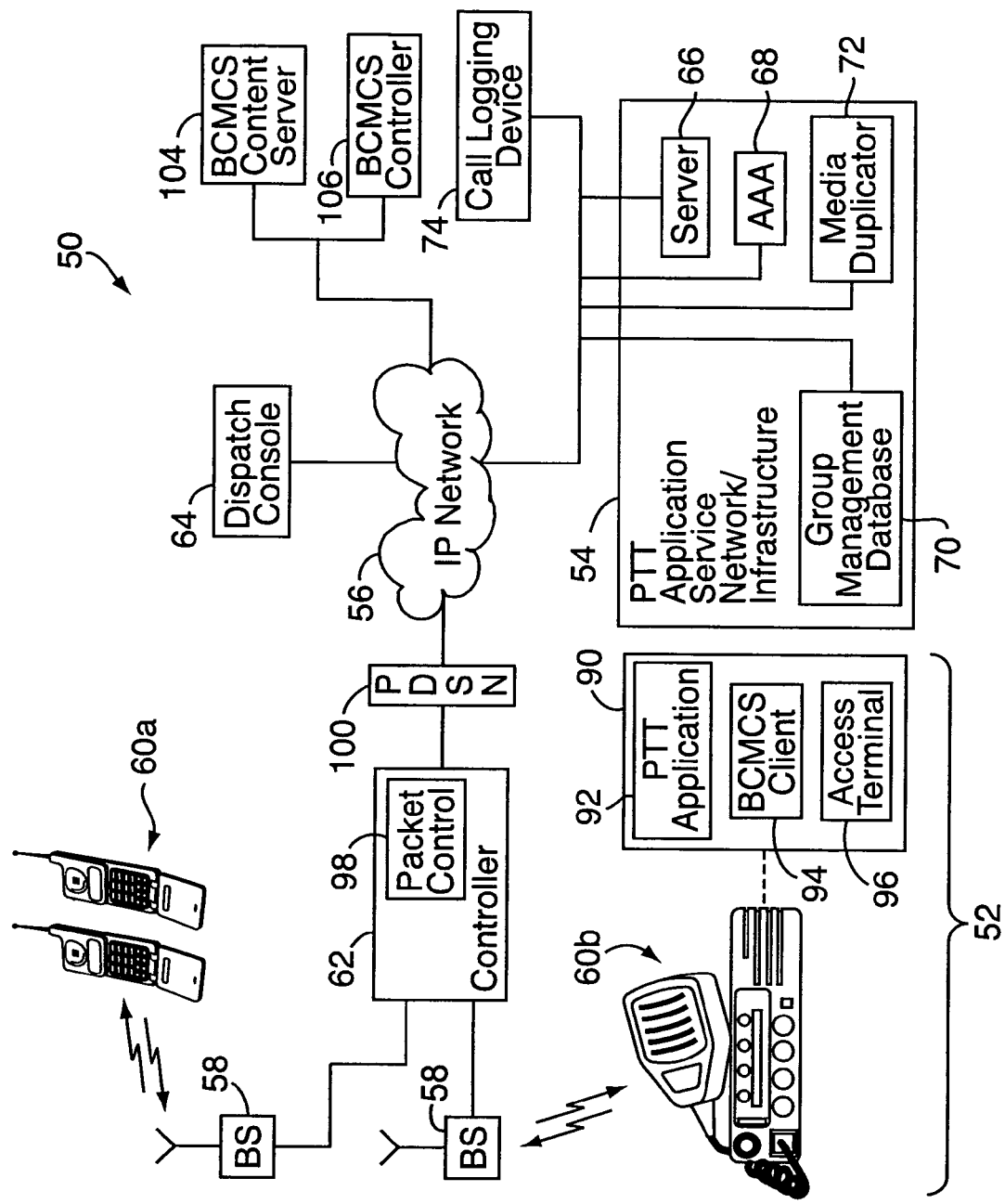
FIG. 2 is a schematic diagram of a push-to-talk group call system according to an embodiment of the present invention.

With reference to FIG. 3, Broadcast Multicast Service packet streams ("flows") in the radio access network 52 are identified through use of a BCMCS flow identifier "BCMCS_FLOW_ID" 80. The BCMCS_FLOW_ID 80 is an alias designed for efficient delivery of data over the air interface, and uniquely identifies a multicast IP data flow in the radio access network 52. The flow identifier 80 may be 16, 24, or 32 bits in length (the identifier shown in FIG. 3 is 16 bits in length), and includes three subfields. The first subfield is a flow discriminator length subfield 82 occupying the three most significant bits of the flow identifier 80. The flow discriminator length subfield 82 indicates the length of a flow discriminator field 84 used for discriminating different broadcast/multicast flows within a BCMCS "program." For the example shown in FIG. 3, the subfield 82 has a value of binary "111" (decimal 7), which indicates that the flow discriminator field 84 is seven bits long, as shown. The third subfield is a BCMCS program ID 86. The BCMCS program ID 86 is an identifier that uniquely identifies a BCMCS program. A BCMCS program can consist of multiple information flows. One flow, for example, could be used to carry audio associated with the program. Another flow could be used to carry video or other multimedia content. In a public safety network context, a BCMCS program ID 86, for example, could identify a BCMCS program used by a public safety dispatcher. One flow associated with the BCMCS program ID 86 could be used to carry audio. Another flow could carry text. Still another flow could carry images. As should be appreciated, the boundary between the BCMCS program ID 86 and flow discriminator subfield 84 is defined by the flow discriminator length subfield 82.

The flow discriminator subfield 84 identifies a particular information flow within a BCMCS program. Using the flow discriminator, for example, an access terminal client program 96 can selectively play out the audio associated with the BCMCS dispatch program while buffering other flows (e.g., images, text) associated with the BCMCS program. The example flow identifier 80 shown in FIG. 3 would allow for up to 128 different flow discriminators per BCMCS program ID (7 bit field=$2^7$=128 possibilities).

Broadcast overhead messages ("BOM") carried over the 1x-EVDO forward link inform the mobile stations 60a, 60b of the BCMCS flows which are currently being carried in a sector. They also provide information on which forward link physical layer timeslots should be decoded to receive the desired packet flows, and information on the number of physical layer slots per broadcast physical layer packet and physical layer rate used to transmit the flow (so-called "logical to physical mapping"). Broadcast overhead messages can be sent as frequently as once every 426 milliseconds. BOM distribution frequency is of note because of the role it plays in the delays experienced by calls that use the High Rate Broadcast Multicast Air Interface (discussed in more detail below).

The BCMCS flows carried in a sector can be "nailed up" through administrative means ("static flows"), or set up and torn down based on whether mobile stations 60a, 60b wishing to receive the BCMCS flows are present in the sector ("dynamic flows"). Static BCMCS flows are carried in a sector regardless of whether there are mobile stations 60a, 60b present in the sector that wish to receive them. The radio access network 52 carries dynamic flows in a sector only if there are mobile stations 60a, 60b present in the sector that wish to receive them. BCMCS flow registration procedures are defined to allow mobile stations 60a, 60b to request that the radio access network 52 carry one or more flows in a sector when they determine by decoding broadcast overhead messages that desired flows are not currently being carried in a sector. Procedures are also defined to allow the radio access network 52 to determine whether it can stop carrying a flow when no recipient mobile stations 60a, 60b are present in the cell/sector. Note that registration messages could be transmitted by a potentially large number of mobile stations 60a, 60b in a sector that wish to receive one or more BCMCS flows. The procedures are defined to allow control of BCMCS flow registration message volume.

As noted, the radio access network 52 utilizes the CDMA2000® 1x-EVDO protocol/standard (or a similar standard) for carrying out wireless communications. The 1x-EVDO standard's High Rate Broadcast Multicast Packet Data Air Interface is used for the delivery of downlink packets, and may be beneficial for providing the scale needed in particular implementations of the group call system 50, e.g., for certain voice services carried over public safety networks. Regarding scale, the High Rate Broadcast Multicast Packet Data Air Interface (or a similar interface) avoids content duplication, thus allowing for the support of communication capabilities such as voice dispatch and call groups for large numbers of end users. Using conventional methods, the only option for delivering voice and associated signaling to mobile stations in an active group call would be to use "multi-unicast": if "N" Mobile stations are involved in a group call, one point-to-point data link is established between a PTT server and each of the N members of the group call. Such an approach does not provide the scale needed when, e.g., large numbers of first responders respond to the scene of an accident. For example, there could over 100 first responders within a sector that need group call capabilities. This resource requirement far exceeds the unicast voice call capacity of most radio access networks. Furthermore, multi-unicast communications can involve setup delays, since each member of the group call is individually paged and individual traffic channels are established before receiving the initial "talkspurt" (meaning useful voice of other data).

In the group call system 50, multi unicast-based transmissions may be adequate in certain situations, e.g., ad hoc group calls, or calls with small numbers of members. However, a different approach is needed to provide voice services for "mission-critical" group calls. Mission-critical group calls are defined as calls which need to be setup quickly (<500 ms), calls for which group membership is relatively static (e.g., squad-level call groups, call groups defined for daily operations, or call groups regularly addressed by dispatchers), and/or calls for which it is known a priori that multi-unicast methods will not provide the scale needed, or for which it has been decided that air interface inefficiencies associated with the use of broadcast channels for supporting a small number of links in a sector are outweighed by operational ease or other factors.

To reduce call setup times and to provide the scale needed for mission-critical call groups, the group call system 50 uses "standing" call groups. These are ongoing group communication/transmission channels pre-established between the PTT application service network and authorized call group users. By "pre-established," it is meant that the channels are established potentially well in advance of actual user voice or other data communications. Session management for standing call groups can be provided by the session initiation protocol ("SIP") or another, similar protocol. SIP is the signaling protocol for VoIP. When a mobile station 60a, 60b or other access terminal powers on, it will perform signaling with the PTT server 66 to join desired standing call groups. When joining, the mobile station 60a, 60b will be authenticated and provided with the parameters needed for receiving the forward link bearer and notification channels associated with the call group, as well as the parameters which inform the mobile station client (software running on the mobile station or other access terminal for interfacing with the PTT server 66) how and where to send reverse link bearer and floor control requests. This pre-establishment of calls is needed to provide quick response times upon the occurrence of a PTT event, e.g., when a user hits the pressel on a terminal. Once a user has joined a standing call group, short application-layer floor control messages will be used by clients to signal their desire to speak to the group. Short application-layer notification messages sent by the PTT server 66 (carried over BCMCS flows) will be used to inform members of a group when user data is being carried on their group.

Figure 4:
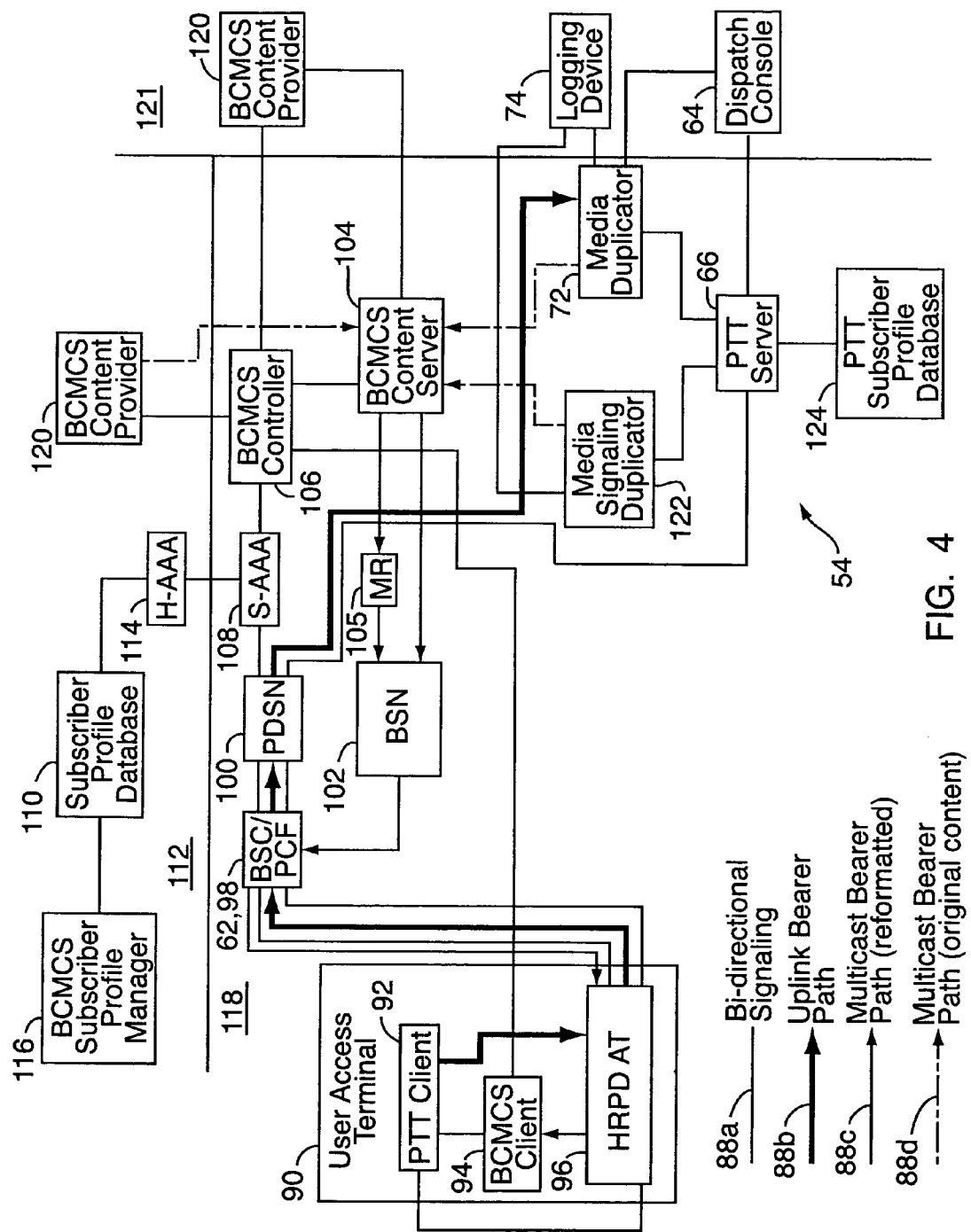
FIG. 4 is a more detailed schematic view of the group call system.

FIG. 4 shows the group call system 50 in more detail, especially as relating to how the PTT application service network 54 supports push-to-talk services over the radio access network 1x-EVDO's Broadcast Multicast Service. In FIG. 4, signal paths 88a represent bi-direction signaling, signal paths 88b represent the uplink (reverse link) bearer path, signal paths 88c represent reformatted multicast bearer paths, and signal paths 88d represent original content multicast bearer paths.

The group call system 50 supports one or more user access terminals 90. The access terminals 90 are user devices supporting network-centric services over the 1x-EVDO radio access network 52. Access terminals 90 may include, e.g., the mobile stations 60a, 60b and/or other wireless devices. Each access terminal 90 is provided with a PTT application/client 92, which is a software program providing call control (e.g., setup, teardown, floor control) and bearer traffic processing (e.g., sending reverse link voice packets, receiving forward link voice packets) functions on the terminal 90. Each access terminal also has a BCMCS client 94, which is a software program providing call control (registration/de-registration, encryption key management, etc.) and packet stream reception for forward link content streams delivered using BCMCS. Finally, a high-rate packet data access terminal ("HRPD AT") 96 is a modem providing data connectivity with the radio access network 52.

The access terminals 90 (e.g., mobile stations 60a, 60b) are operably connected to the base station controller 62 ("BSC"), which may include and/or work in conjunction with a packet control function 98 ("PCF"). The base station controller 62 and/or packet control function 98 are responsible for signaling, establishing, and tearing down bearer channels (i.e., data channels) between a packet data service node 100 ("PDSN") and the access terminals 90. If link layer encryption is enabled, the base station controller 62 also encrypts the content before forwarding it over the air interface. As discussed in more detail below, the base station controller 62 chooses the "best" bearer channel to the access terminal 90 based on considerations such as optimization of resources, QoS requested, etc. The packet data serving node 100 anchors the access terminal's unicast IP address.

The base station controller 62 is operably connected to a broadcast service/serving node 102 ("BSN"), which is responsible for communicating with the base station controller 62 to add and remove multicast IP flows. In other words, the BSN 102 works in conjunction with the base station controller 62 for transmitting a plurality of multicast IP flows across the airlink for possible reception/decoding by one or more mobile stations 60a, 60b. The broadcast service node 102 uses IP multicast routing protocols to manage bearers supporting multicast IP flow between itself and the nearest router connecting back to a BCMCS content server 104, e.g., a multicast IP router 105 supporting IP-multicast. It also applies the flow treatment received from a BCMCS controller 106 to the multicast IP flows. One or more serving authentication, authorization, and accounting servers 108 ("S-AAA") are connected to the PDSN 100 and BCMCS controller 106, and are responsible for BCMCS authentications, authorizations, and accounting. The S-AAA servers 108 access one or more subscriber profile databases 110 to obtain user subscription profiles. The S-AAA server 108 may send the user subscription profile to the BCMCS controller 106. The subscriber profile database(s) 110 will typically be part of a "home" network 112, which may also include an authentication, authorization, and accounting module 114 and a BCMCS subscriber profile manager 116. The home network 112 would be separate from the serving network 118, which is the portion of the group call system 50 that provides the communications infrastructure, e.g., the PTT application service network 54 and radio access network 52 in combination.

The BCMCS content server 104 makes BCMCS content (e.g., PTT audio packets) available within an IP multicast stream. If higher layer encryption is enabled, the BCMCS content server 104 may encrypt the stream content. The BCMCS controller 106 is the core network element responsible for managing and providing BCMCS session information to the PDSN 100, the access terminal 90, and the BCMCS content server 104. It also performs authorization using the BCMCS user profile received from the subscriber profile database 110 through the S-AAA 108. The BCMCS controller 106 serves the function of multicast services encryption key distribution, and can also perform discovery operations to find desired content. The BCMCS controller 106 may be configured to authenticate a BCMCS content provider 120 (possibly on another network 121 such as the Internet) via authentication, authorization, and accounting functions, and may coordinate the delivery of BCMCS content to the BCMCS content server 104. The BCMCS content provider 120 provides content (e.g., IP data flow) for distribution to users receiving content over BCMCS.

The PTT server 66, as indicated above, performs call control functions (e.g., call setup, floor control, late join, presence management) for PTT calls, as well as other supplementary services such as authentication and presence management. Functionally interposed between the PTT server 66 and the BCMCS content server 104 are the media duplicator 72 and a media-signaling duplicator 122. The media duplicator 72 duplicates (and potentially transcodes) and transmits audio packets to all ports (devices with IP addresses) listening to a PTT call. The media-signaling duplicator 122 duplicates (and potentially transcodes) and transmits control packets to all ports listening to a PTT call. A PTT subscriber profile database 124 may be connected to the PTT sever 66 for administering group membership (e.g., which users belong to which call groups, what features they are eligible to use, default floor control priority levels, or the like).

The High Rate Packet Data Air Interface provides bearer services for standing call groups. In addition to carrying voice bearer traffic, it also provides the mechanism needed to quickly alert the mobile stations 60a, 60b and other access terminals 90 when their call groups become active, providing access terminal clients 94 with hooks needed to implement power conservation methods when talkspurt is not being carried on their groups. Application layer notification channels carried over BCMCS flows give access terminals 90 the ability to monitor multiple call groups, and, when more than one group is active, to decide which group's audio to play out. Periodic transmission of notification messages when a call group is actively carrying talkspurts provides for "late entry."

BCMCS provides the mechanisms for transparently delivering multicast IP content to user terminals 90 as they pass through sectors in the radio access network 52. The determination of which data flows to carry in which sectors is handled through BCMCS flow registration procedures.

Members of standing call groups accessing PTT services via the 1x-EVDO radio access network 52 register with the PTT server 66 when they power on. The PTT server 66 informs the access terminal 90 of a number of parameters needed to access service for the standing group. These parameters may include: codec type; security parameters; the IP address/port to send reverse link floor control messages to (sent using a unicast uplink); and the IP address/port to send reverse link vocoder packets to (also sent using a unicast uplink). Another parameter might be the IP multicast address (es)/port(s) to listen to for control/status/notification messages and/or bearer packets sent by the PTT server 66 for the standing group. Control/status/notification messages and bearer packets sent by the PTT server 66 will be delivered to the access terminals 90 using the High Rate Broadcast Multicast Air Interface. The PTT server 66 may also perform IP-based signaling for providing other services such as presence management for acknowledged group calls, location information, and the like.

Once the access terminals 90 have received the IP multicast address/ports associated with forward link bearer channels, notification channels, and other information flows, the access terminal 90 sends a request to the radio access network 52 asking for the BCMCS_FLOW_ID associated with each desired IP multicast address/port combination. Later, when a mobile user hits the pressel, a short floor control message is sent to the PTT server 66. The request may contain a priority level to allow authorized users to seize the floor from lower priority users. The PTT server 66 arbitrates floor control. When the floor is granted to a new access terminal 90, a notification message is sent out over the IP multicast address/port associated with the call group's notification channel. These packets are delivered over the radio access network 52, as are the bearer channels/services. A single notification message is sent out to all group members in the same cell.

For explanatory purposes, the procedures for providing network-centric PTT services over the radio access network 52 can be divided into two segments. The first involves signing on to a standing group, and the second relates to user data transmissions (e.g., when a member of a standing call group begins speaking) in terms of floor control, delivery of bearer traffic, and delay analysis.

For an access terminal 90 to join a standing call group or dispatch session, it will typically be the case that the following have occurred or will occur: the access terminal 90 has established an active point-to-point protocol ("PPP") session with the PDSN 100; the access terminal 90 has been assigned an IP address by the PDSN 100; the access terminal's session layer is in the open state (UATI assigned); the access terminal's connection layer may be in a "closed state," meaning that unicast communications between the access terminal 90 and network are conducted over an access channel and a control channel; and SIP signaling is employed for session management.

Figure 5:
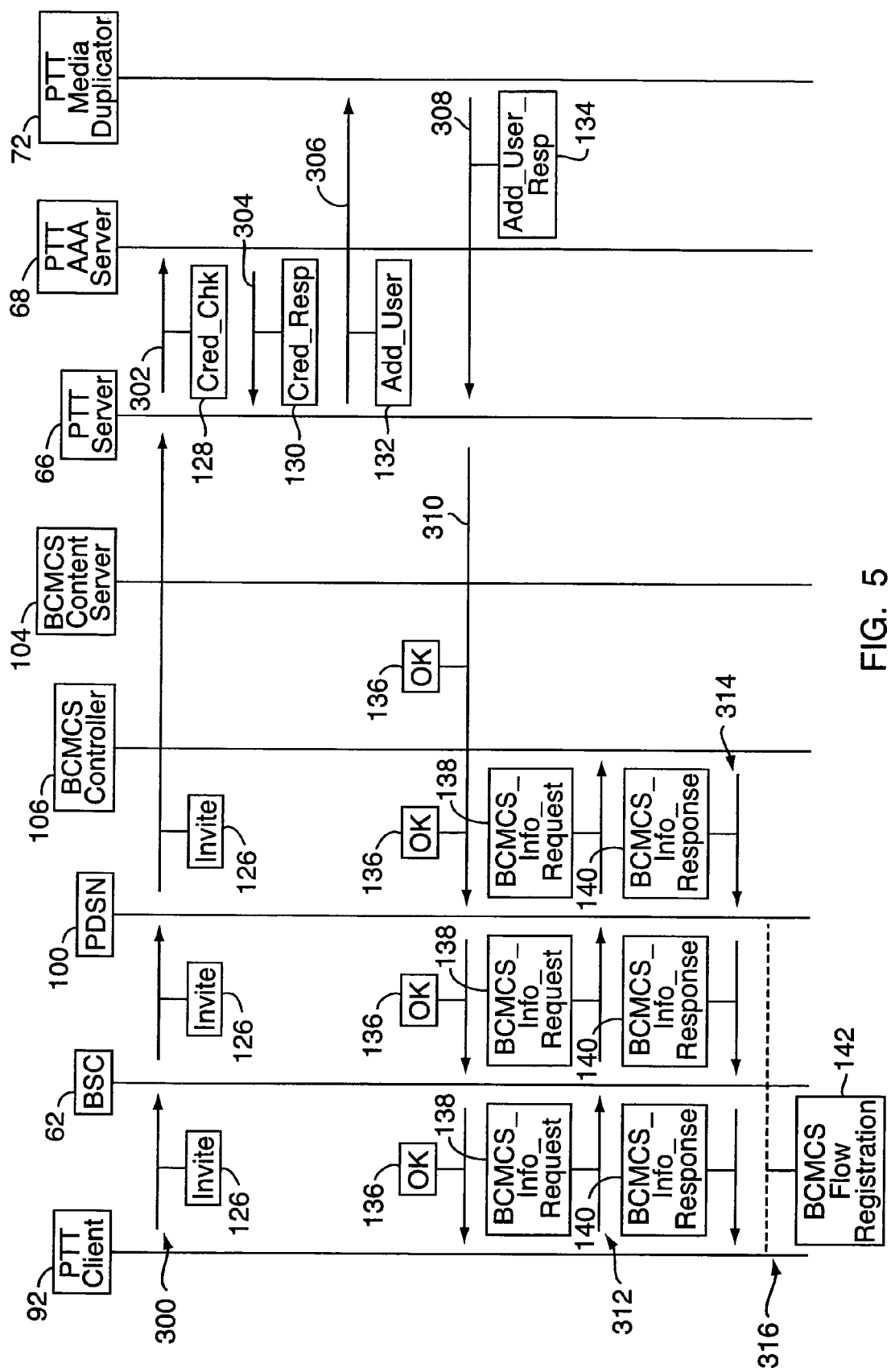
FIG. 5 is a signaling diagram showing an access terminal (e.g., mobile station) joining a standing call group according to the present invention.
Figure 6:
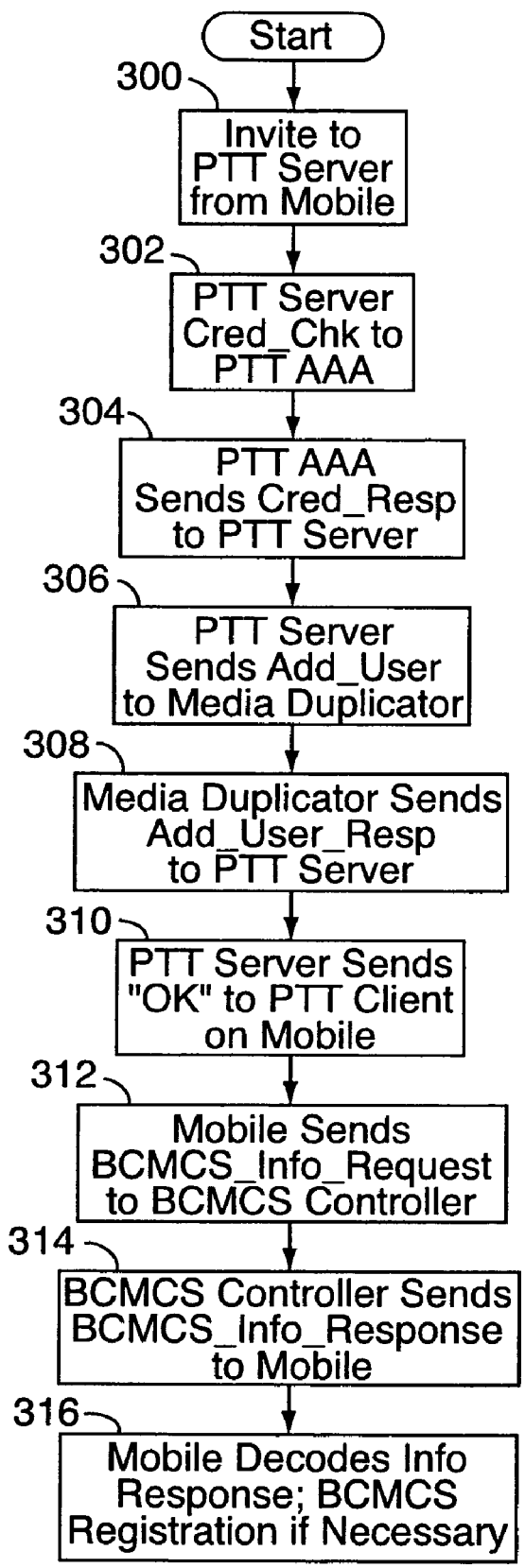
FIG. 6 is a flowchart showing the steps of an access terminal joining a standing call group.

FIGS. 5 and 6 show an exemplary method by which an access terminal 90 joins a standing call group. At Step 300, the access terminal (e.g., mobile station) PTT client 92 sends an SIP "INVITE" message 126 to the PTT server 66. The INVITE message 126 includes: the address of the static group the user wishes to join, e.g., "squad3tactical@holmdelpolice.com"; the address of the user wishing to join the session, e.g., "ltwilliams.jones@holmdelpolice.com"; the IP address that the PTT server 66 should use to send SIP signaling messages to, which corresponds to the network address that has been assigned to the access terminal's PPP session by the PDSN 100; a display name of the user wishing to join the session, e.g., "Lt. Jones"; and other SIP INVITE parameters such as call-ID and Cseq. One or more of the following may be piggybacked on the SIP INVITE 126 using, e.g., the session description protocol ("SDP") or the like: media parameters of the user's PTT client (reverse link and forward link codec type); application layer credentials used by the PTT server 66 to authenticate the user; and/or the type of service the user is requesting. Service types can include, for the bearer, listen only (for dispatch channels and call recording devices), and listen and speak; and request for associated notification channel for distribution of caller ID and floor control messages.

At Step 302, the PTT server 66 sends a credential check ("Cred_Chk") message 128 to the PTT AAA server/module 68 which contains: a user ID; the ID of the static group the user wishes to join, e.g., "squad3tactical@holmdelpolice.com"; application layer credentials; and the type of service the user is requesting. Then, at Step 304, the PTT AAA server 68 sends a credential response ("Cred_Resp") message 130 back to the PTT sever 66. This contains: a result code, e.g., "user authorized"; and a priority level to use for floor requests from this user on this call group. If needed, the PTT server 66 retrieves floor control policy information to use for the particular group call. At Step 306, the PTT sever 66 sends an "Add_User" request 132 to the media duplicator 72 containing: the ID of the static group; the media parameters of the user's PTT client 92; the type of service the user is requesting (e.g., bearer: listen only, listen and speak; associated notification channel); and the encryption parameters to use on the streams. The media duplicator 72 assigns address/ports to the session, and if ports have been previously assigned, it returns those associated with the static group. Next, at Step 308, the media duplicator 72 sends an "Add_User_Resp" message 134 to the PTT server 66. This message contains: the IP address/port associated with the reverse link bearer; the multicast IP address/port associated with the forward link bearer; the multicast IP address/port associated with the notification channel for the session; and the multicast IP address/ports of any other assigned downlink channels, e.g., for images or other streams. Then, at Step 310, the PTT server 66 sends an "OK" message 136 to the PTT client 92 containing: the parameters associated with the SIP OK message 136 plus additional parameters (e.g., in SDP format); the BCMCS content name for forward link channels; the IP address/port associated with the reverse link bearer; the multicast IP address/port associated with each forward link bearer stream; the multicast IP address/port associated with the notification channel for the session; the application layer encryption parameters for each stream; and the reverse link IP address/port the access terminal 90 should send floor control messages to.

At Step 312, the access terminal 90 sends a BCMCS information request message 138 ("BCMCS_Info_Request") to the BCMCS controller 106, which contains the multicast IP address/port combinations for each forward link channel associated with the static group. The BCMCS controller 106 retrieves information on the relative priority of the forward link streams. Also, the BCMCS controller 106 authenticates the user. At Step 314 the BCMCS controller 106 sends a BCMCS information response message 140 ("BCMCS_Info_Response") to the access terminal 90, which contains mobile security parameters and BCMCS flow identifiers 80 for each forward link channel. At Step 316, the access terminal 90 decodes the BCMCS_Info_Response message received from the BCMCS controller 106, looking for BCMCS flow identifiers 80 associated with the static group. If the access terminal 90 does not find appropriate flow identifiers or sees that BCMCS registration is required, it sends a BCMCS registration message with appropriate BCMCS flow identifiers 80 using standard BCMCS flow registration procedures 142. Also, when the access terminal 90 (e.g., mobile station 60a, 60b) drifts into a new cell, it decodes received BOM's (broadcast overhead messages) and looks for flow identifiers associated with its static groups. If flow identifiers are not advertised, it registers for the flow using standard BCMCS flow registration procedures. It should be noted that mobile stations 60a, 60b and landline/wire hosts use similar procedures to register with the PTT server 66, since certain non-wireless users may need to join the groups, e.g., the dispatch consoles and call logging devices.

As indicated, a user signs on to a standing call group by establishing a PPP connection with the PDSN 100, register-ing with the PTT server 66, and joining the standing PTT group call or dispatch session through IP-based signaling. To speak, the user first obtains permission from the PTT server 66. The process for obtaining permission can be roughly divided into two steps: the access terminal 90 sends a "floor request" to the PTT server 66 (meaning a message requesting permission to speak), and the PTT server 66 transmits a floor assignment message back to the user's access terminal 90. If the user has not already joined the standing PTT group call in question, it is typically the case that this will be done prior to sending a floor request, to avoid delay.

Figure 7:
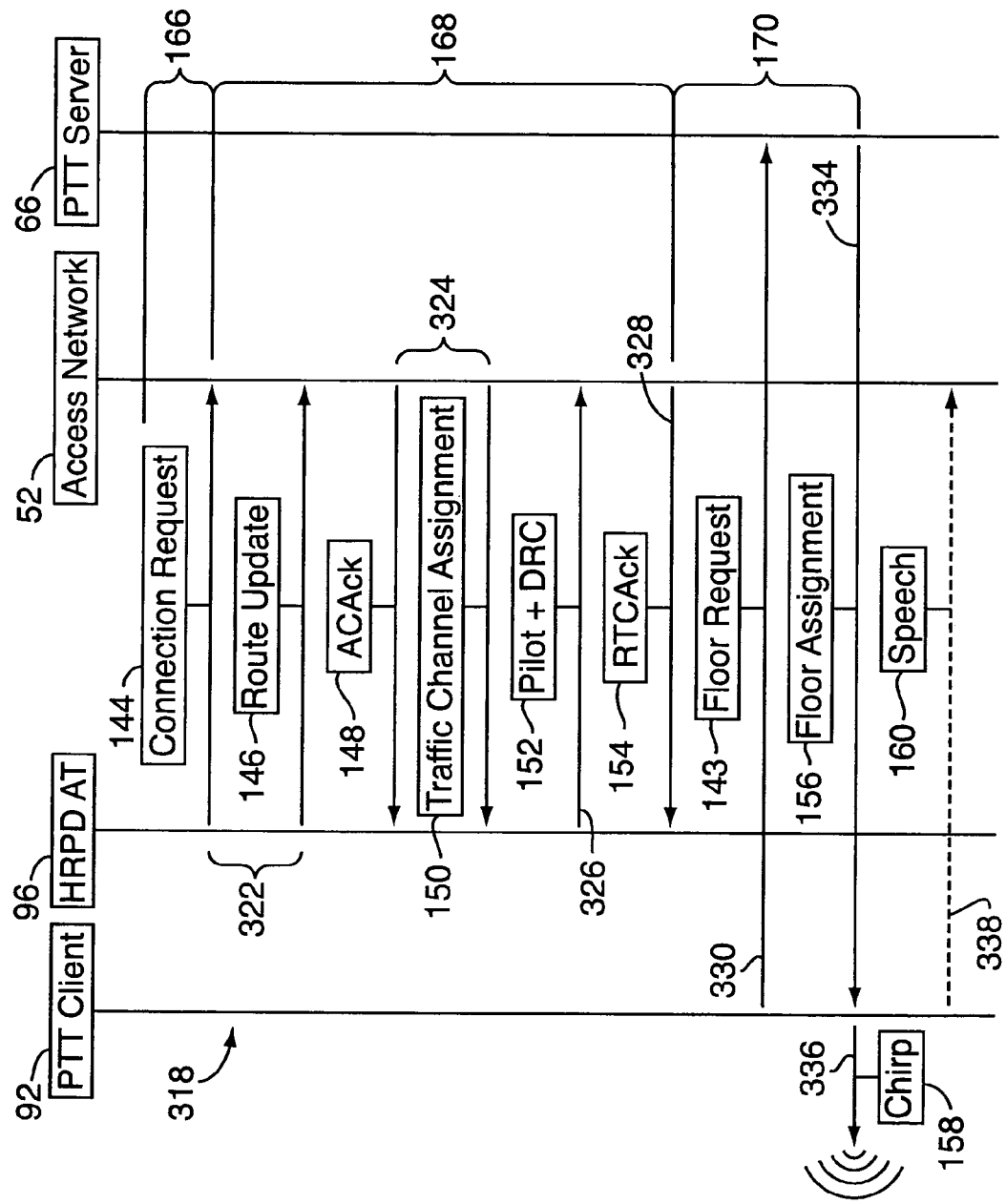
FIG. 7 is a signaling diagram showing floor request signaling between a push-to-talk server and an access terminal.
Figure 8:
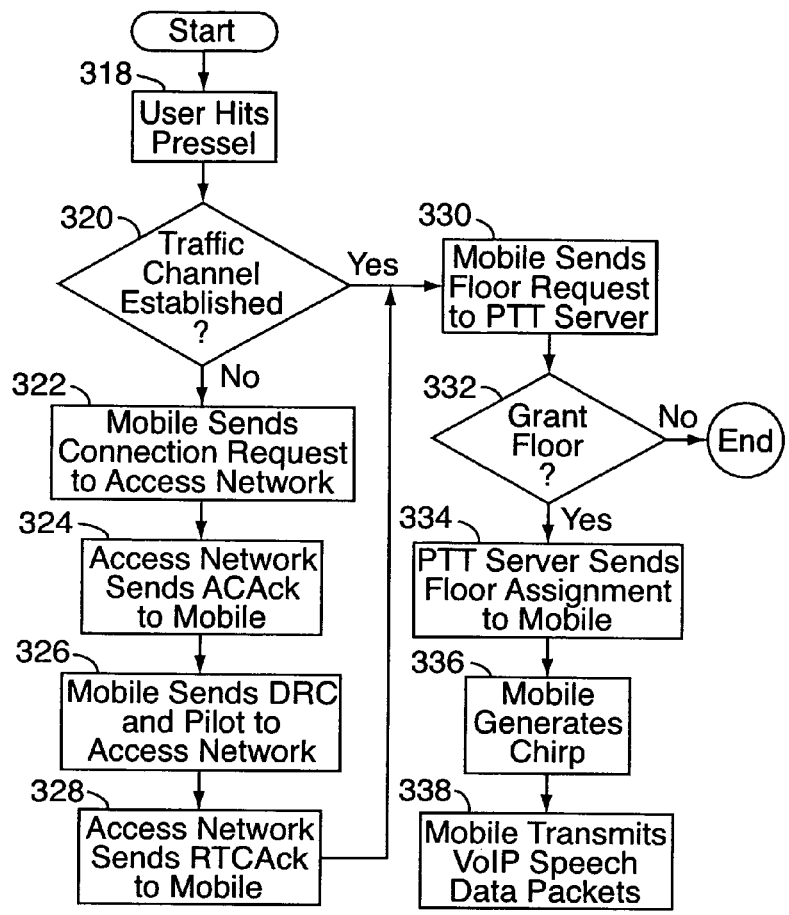
FIG. 8 is a flowchart showing an access terminal floor request.

FIGS. 7 and 8 show the steps involved in a floor request in terms of the floor control signaling between the PTT client 92 on the access terminal 90 and the PTT server 66. To request a floor, the user hits a pressel (a "transmit" or "talk" button) on the access terminal 90 at Step 318. In response, the PTT client 92 prompts the HRPD AT 96 to initiate the sending of a "FloorRequest" signaling message 143. If a traffic channel has not been previously established, as determined at Step 320, the HRPD AT 96 first initiates traffic channel setup procedures. For setting up a traffic channel, at Step 322 the HRPD AT 96 sends a connection layer idle state protocol message 144 ("ConnectionRequest") and a connection layer route update protocol message 146 ("RouteUpdate") according to random access procedures specified by the HRPD access channel MAC. These messages are sent to the access network, e.g., the radio access network 52 or component therein. At Step 324, the access network 52 acknowledges receipt of the ConnectionRequest message 144 by sending an access control acknowledgement message 148 ("ACAck") back to the mobile station's HRPD AT 96. The access network 52 also sends a traffic channel assignment message 150 ("TrafficChannelAssignment") to the HRPD AT 96. Then, at Step 326, the HRPD AT 96 starts transmitting a data rate control ("DRC") channel and pilot channel 152 using procedures specified in the HRPD reverse traffic channel MAC. Once the access network 52 has acquired the traffic channel, it sends a reverse traffic channel acknowledgement message 154 ("RTCAck") to the HRPD AT 96, at Step 328. In response, the HRPD AT 96 may send a message (not shown) to the access network 52 indicating that the traffic channel setup has been successful. Upon receipt of this message, the traffic channel setup is complete.

With the traffic channel setup having been completed if necessary, at Step 330 the PTT client 92 sends the FloorRequest message 143 to the PTT server 66. At Step 332, the PTT server 66 applies multi-level pre-emption and priority rules in deciding whether the user should be granted the floor. Upon deciding to grant the floor, the PTT server 66 sends a "FloorAssignment" message 156 to the access terminal 90, at Step 334. As described below, the PTT server 66 may also send the FloorAssignment message 156 to all call group members using BCMCS in order to provide speaker identification and to reject floor requests from other group members who may have simultaneously requested the floor. Once the PTT client 92 that is being granted the floor receives the FloorAssignment message 156, the access terminal 90 generates a sound 158 ("chirp"), at Step 336, to inform the user that permission to speak has been granted so that the user may begin speaking. At Step 338, the user's speech data packets 160 may now be sent over the traffic channel using VoIP. It should be noted that inactivity timer values are configured so that the traffic channel is maintained for at least the amount of time it would take the PTT server 66 to respond to the FloorRequest message 143. This avoids the latencies associated with another traffic channel setup once the user has been granted the floor. Also, alternatively, the HRPD AT 96 may use procedures to piggyback the FloorRequest message 143 as a short data burst sent using one or more access channel capsules.

Once a user has been granted the floor, as the user's speech data packets 160 are sent over the traffic channel, they are received by the radio access network 52 and the PTT application service network 54. The data packets are then transmitted to the other access terminals in the call group as a BCMCS flow.

The PTT server 66 sends the FloorAssignment message 156 to the user granted the floor using unicast procedures over the traffic channel. In addition, the PTT server 66 may also send the FloorAssignment message 156 to all call group members in order to identify the speaker (e.g., the user granted the floor) and also to reject floor requests from other call group members who may have simultaneously requested the floor. This information could be sent over multiple unicast channels, but this may result in reduced forward link and reverse link capacities (e.g., from unnecessary acknowledgement) and increased latencies. As such, the floor assignment message 156 may be carried using a BCMCS flow.

Figure 9:
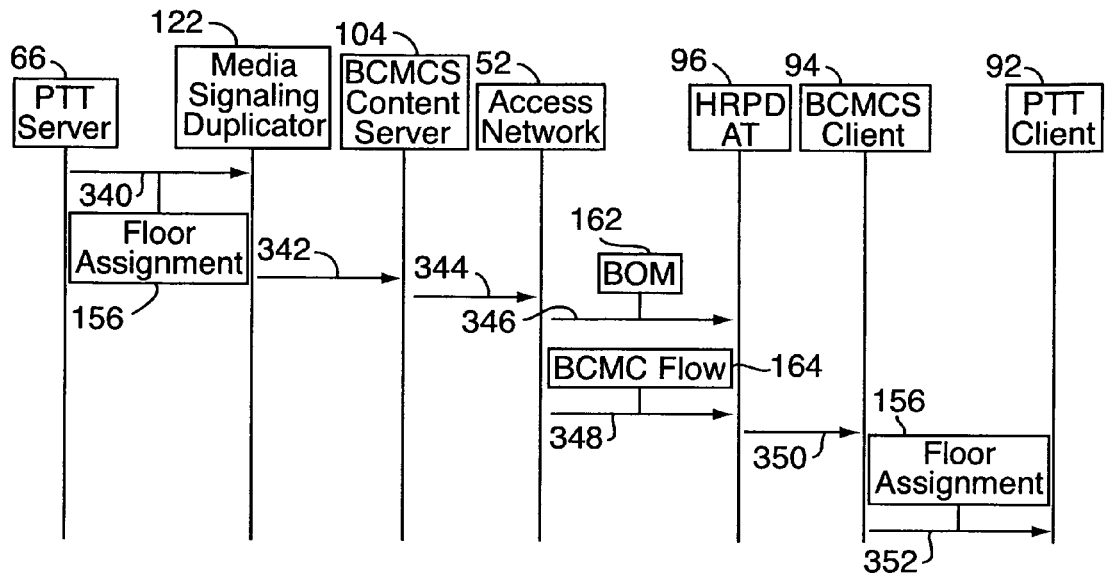
FIG. 9 is a signaling diagram showing the use of a broadcast multicast flow to carry a floor assignment message.

The steps involved in using a BCMCS flow to carry the FloorAssignment message 156 are shown in FIG. 9. In particular, FIG. 9 shows the floor assignment signaling between the PTT server 66 and call group members using a BCMCS flow previously established to carry signaling for the standing call group. At Step 340, the PTT server 66 sends the FloorAssignment message 156 to the media signaling duplicator 122 indicating that the message 156 should be sent to a particular multicast IP address. At Step 342, the media signaling duplicator 122 provides the message 156 to the BCMCS content server 104 for delivery using the BCMCS flow established for signaling. At Step 344, the BCMCS content server 104 encrypts the message and sends it via the BCMCS serving node 102 to the access network 52. At Step 346, the access network 52 provides scheduling information (e.g., interlace-multiplex combinations on which the flow is scheduled) for the flow using one or more broadcast overhead messages 162. Also, at Step 348, the access network 52 transmits the BCMCS flow 164 on the designated interlace-multiplex combination. The BCMCS flow 164 is received by the mobile station's HRPD AT 96 and forwarded to the BCMCS client 94 at Step 350. At Step 352, the BCMCS client 94 receives the content carried by the flow, decrypts it, and passes the decrypted FloorAssignment message 156 to the PTT client 92.

Figure 10:
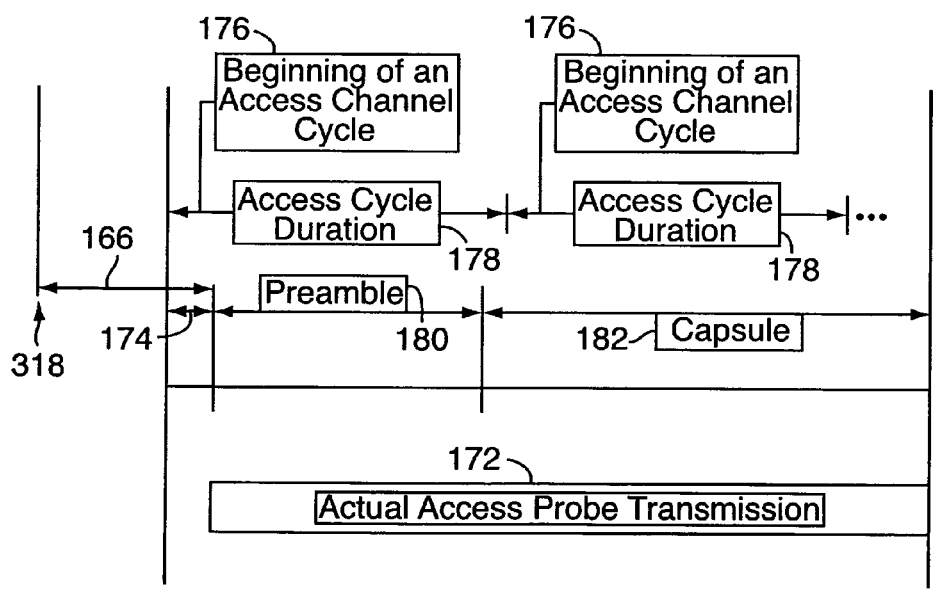
FIG. 10 is a schematic timing diagram of delay components in an access channel probe transmission for floor control.

For floor control, the primary performance metric of interest is the "chirp delay," which is defined as the time it takes for the user to hear a chirp 158 (indicating that the floor has been granted) after hitting the pressel and the mobile station requesting the floor. With reference to FIGS. 7 and 10, the components of delay include an initial delay 166, a traffic channel setup time 168, and a media signaling time 170. The initial delay 166 is the time between when the pressel (transmit/talk button) is pressed at Step 318 to the time of a first access probe transmission 172 on the access channel, e.g., sending the ConnectionRequest message 144 at Step 322. The initial delay 166 may include the time required to acquire sector and access parameters if the HRPD AT 96 determines that these are not current, as well as the amount of time 174 to the start 176 of the first access channel cycle 178 that does not overlap with a reverse link silence interval. There may also be a persistence test delay wherein access probes are not transmitted until passing an initial persistence test. In order to reduce this delay, users or transactions may be able to use favorable settings of persistence parameters such as "Apersistence" defined in the standard. In one embodiment, Apersistence is set to allow immediate transmission of probes in the current access cycle. In another embodiment, Apersistence is set to allow smaller average delay than other classes of users or transactions. In the case of, e.g., one capsule and one access probe, the traffic channel setup time 168 may include: a preamble duration 180; a MAC layer capsule transmission time 182 for sending the ConnectionRequest 144 and RouteUpdate 146 messages; the time required to send the ACAck message 148; the time required to send the RTCAck message 154 after DRC+pilot 152 transmission begins; and the transmission time for the HRPD AT 96 to send a "traffic channel complete" message. The media signaling time 170 includes the transmission time for the FloorRequest message 143 and the transmission time for the FloorAssignment message 156.

The components of the time delay between generating the floor request to first transmitting the access probe(s) 196 are shown in FIG. 10. These delay components are related to the structure of the CDMA2000® HRPD access channel. An open loop power estimate is used for the transmission of the first access probe from the access terminal 90 to the radio access network 52. The open loop estimate is computed by the access terminal 90 based on the mean received power estimate, and can be adjusted by the radio access network 52 using two calculated parameters, "OpenLoopAdjust" and "ProbeInitialAdjust." The values of these parameters will typically be set in order to ensure a high probability of success on the first probe transmission. If the first probe is unsuccessful, then the access terminal 90 can retry at a higher power level. However, the access terminal 90 has to wait for at least 128 slots (128 slots·1.67 ms/slot) before the retry. In order to reduce delay and increase the probability of success for probe transmissions, transmit powers associated with access probe transmissions may be initially set to a higher value than that indicated by "OpenLoopAdjust" and "ProbeInitialAdjust." In one embodiment, there may be an additive or multiplicative aggression factor that is applied to the output of the standard method of transmit power calculation, e.g., an additive or multiplicative function of OpenLoopAdjust and ProbeInitialAdjust. In another embodiment, the transmit power for certain users or transactions (e.g., high priority government users) may be set at a nominally high value (e.g., a maximum allowable transmit power). It is estimated that the chirp delay in the group call system 50 according to the present invention would be in the range of 520-540 ms. If the access cycle duration value is reduced to zero and the preamble length is reduced to one frame, the delay can be reduced to the range of 440-460 ms. Reducing the delay budget for the radio access network 52 elements and PTT server 66 can also result in further delay savings. Additionally, to reduce delay in floor control, the need to send multiple access probes for a floor request can be avoided by increasing the number of frames in a capsule to three.

The primary performance metric of interest for the bearer path (e.g., channels bearing user information signals such as VoIP data) is the "source to destination" delay, which includes delays in the bearer path from the time a user begins to speak (after obtaining the floor) to the time the speech is heard by listeners within the group. With reference to FIG. 4, the bearer path is as follows: path 88b from the source PTT terminal 90→to BSC/PCF 62, 98→to PDSN 100→to media duplicator 72; path 88d to the BCMCS content server 104; and path 88c to the BCMC serving node 102→to BSC/PCF 62, 98→to destination PTT terminal, e.g., another access terminal 90.

In the context of packet voice (e.g., VoIP) transmissions over 3G wireless systems such as CDMA2000® and UMTS, based on the "mean opinion score" criteria for toll quality speech, the delay budget from the source to destination is typically limited to 200 ms with a loss rate under 1%. For mobile-to-mobile calls, a delay budget of 250 ms is typically assumed. Since voice is a real time service that imposes certain delay and jitter requirements, delay in the bearer path will typically be minimized to the extent possible. For PTT-based group calls over BCMCS channels, there could be additional sources of delay. For example, the broadcast overhead message is used to schedule interlace-multiplex pair combinations for a broadcast logical channel (or BCMCS flow) carrying the voice bearer. The broadcast overhead message is transmitted in a CDMA2000® HRPD system using the synchronous control channel capsule which occurs every 426.67 ms. At the expense of some reduced battery life in the access terminal 90 (the terminal is required to decode all interlace-multiplex combinations over which a particular BCMCS flow is "scheduled"), it is possible to avoid the delay incurred upon the onset of voice activity through "virtual allocation" of resources. This is done by scheduling interlace-multiplex pair combinations for standing call groups even during periods when the standing call groups are not carrying talkspurt. Note that these resources can be used to schedule unicast packet data or other broadcast logical channels if there are no speech packets to be sent. In the absence of virtual resource allocation during inactive periods, there will be an additional delay, on the average of 213 ms. Additionally, regarding speech packet aggregation, error control coding is employed at the broadcast MAC layer 184 (e.g., outer Reed Solomon coding) and the broadcast physical layer 186 (e.g., inner turbo coding) in order to improve reliability (see FIG. 11). Note however that each broadcast MAC packet carries 1002 bits while the size of each speech packet is only about 25 octets including the speech frame content and a three byte compressed RTP/UDP/IP header (e.g., the peak rate of the enhanced variable rate codec employed in CDMA2000-type networks is 8.55 kbps). Error control coding on individual speech packets could be inefficient; as a result, speech packets may be aggregated in order to avoid frame-fill inefficiency at the broadcast MAC layer. Aggregating five speech packets would result in 100 ms additional delay on the bearer path.

Regarding queuing delay at the airlink scheduler, for unicast services, the CDMA2000® HRPD airlink allows slot-by-slot scheduling every 1.67 ms at the base station in response to fast channel quality feedback. The HRPD airlink scheduler may be enhanced in order to assign interlace-multiplex pairs for BCMCS flows while taking into account the requirements of the flow from an application perspective. Otherwise, BCMCS flows may encounter significant queuing delay on account of concurrent non-real time unicast data transfers. This may be addressed by creating an awareness of the application requirements within different parts of the radio access network 52. In particular, the exchange of QoS attributes between the access terminal 90 and the PDSN 100 (or the BCMC serving node 102) for different packet applications may help to ensure that real-time applications will not be impacted by non-real time applications such as large file transfers.

Figure 11:
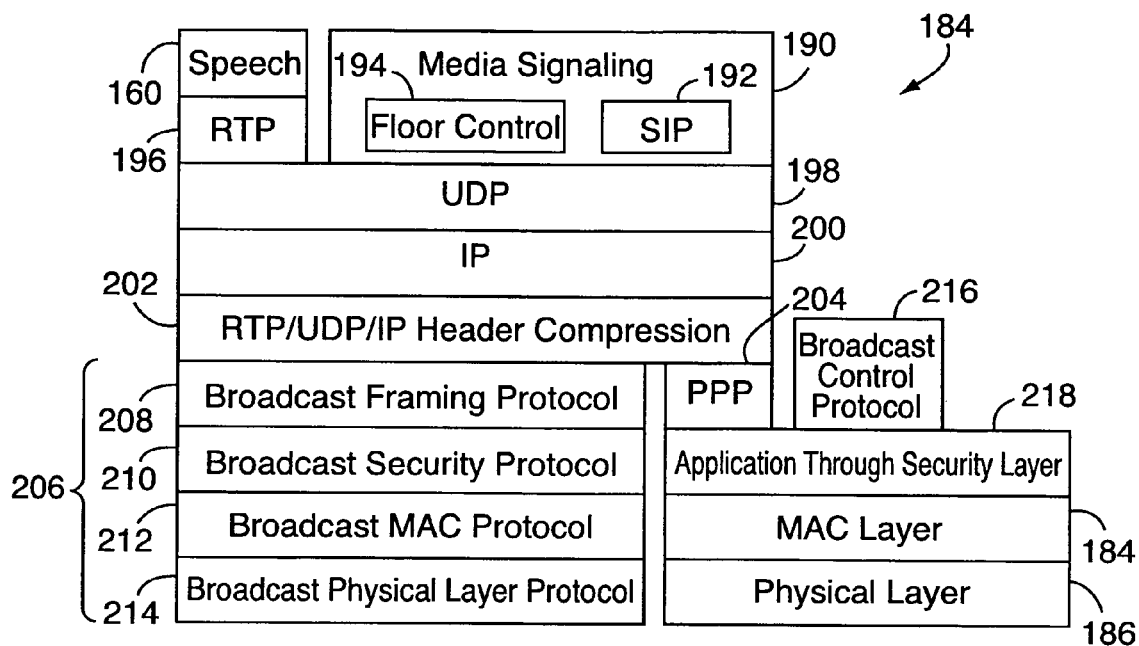
FIG. 11 is a schematic diagram of an access terminal protocol stack.

As indicated above, signal transmissions in the group call system 50 are carried out according to a number of different protocols. Regarding the operation of the PTT access terminals 90 (e.g., mobile stations 60a, 60b), FIG. 11 shows a possible protocol stack 188 in place on an access terminal 90 for both the speech bearer and media signaling. Media signaling 190 for call control and group management is accomplished through the use of an IP-based protocol such as SIP 192 for most functions including registration/de-registration for a particular group, creation of adhoc groups, speech codec negotiation, authentication, authorization, and presence management. New FloorRequest 143 and FloorAssignment 156 messages may be introduced for the purpose of floor control 194, in order to reduce the delay resulting from the transfer of SIP messages that are typically several hundred octets long. Speech frames 160 are transported using the real-time transport protocol ("RTP") 196 and the user datagram protocol ("UDP") 198 over IP 200. Header compression techniques 202 may be employed to compress the RTP/UDP/IP headers down to 2-4 bytes. On the bearer path, speech 160 is carried from the speaker up to the media duplicator 72; PPP 204 is used for framing, and the CDMA2000® HRPD protocols for the default packet application (Release 0) or the multi-flow packet application (Release A) are employed. Speech 160 is delivered to listeners in a talkgroup using the CDMA2000® HRPD broadcast protocol suite 206 comprising the broadcast framing protocol 208, the broadcast security protocol 210, the broadcast MAC protocol 212, the broadcast physical layer protocol 214, and the broadcast control protocol 216. FIG. 11 also shows the application through security layers 218 in relation to the MAC layer 184 and physical layer 186. The application and security layers represent, e.g., the layer of security and other software programs resident on the access terminal 90.

Regarding access terminal operation, the PTT client 92 within the access terminal 90 establishes the context for a group call or voice dispatch session through IP-based signaling with the PTT server 66. Floor control is subsequently carried out according to the procedures described above. The access terminal 90 acquires the multicast IP addresses and port numbers for the group call through signaling (e.g., SIP/SDP). Once these parameters have been acquired, the BCMCS client application 92 acquires the BCMCS flow identifier 80 and a BCMCS access key ("BAK") from the BCMCS controller 106. Speech and media signaling flows can be distinguished through the flow discriminator 84 within the flow identifier 80. Security is provided using the BAK. In addition to acquiring the BCMCS flow identifier 80 from the BCMCS controller 106, the access terminal 90 also negotiates the broadcast protocol suite 206 through the CDMA2000® HRPD session layer. Once the BCMCS flow identifier 80 has been acquired and the broadcast protocol suite 206 has been negotiated, the access terminal 90 monitors the broadcast overhead message in order to determine whether the desired BCMC flows carrying the broadcast speech bearer or media signaling have been scheduled. This message is sent as often as once every synchronous control capsule period of 426.67 ms by the access network 52. Note that monitoring of the synchronous control channel capsule is typically required for BCMCS even if the access terminal 90 happens to be in a "sleep" state for HRPD.

Figure 12:
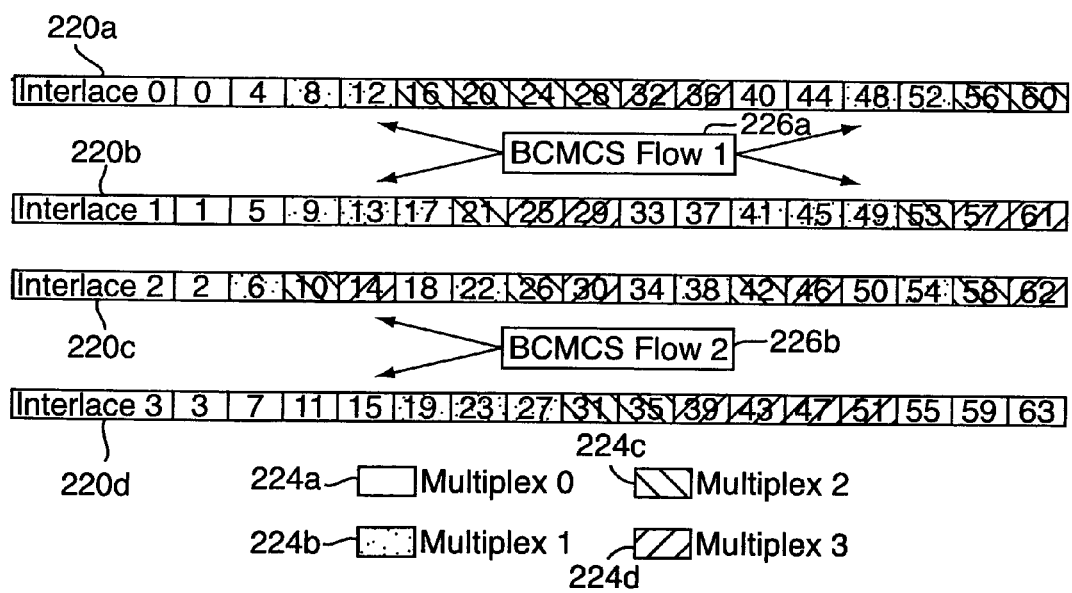
FIG. 12 is a schematic diagram showing the scheduling of broadcast multicast flows on interlace-multiplex combinations.

The schedule for each BCMCS flow is indicated in the form of interlace-multiplex pair combinations as shown in FIG. 12. An "interlace0" 220a comprises time slots numbered 0, 4, 8, etc., while an "interlace1" 220b comprises time sots numbered 1, 5, 9, etc. An "interlace3" 220c and an "interlace4" 220d are similarly structured. In the example shown, there are four multiplexes 224a-224d in each interlace where multiplexes are transmitted in sequence and consist of a variable burst length (in number of slots). The access terminal 90 monitors all slots that belong to interlace-multiplex combinations on which a desired BCMCS flow 226a, 226b is scheduled. If there is no pending data for a flow, then the access network 52 can schedule unicast data which in turn would be discarded by the access terminal 90 if it is not the intended recipient.

Figure 13:
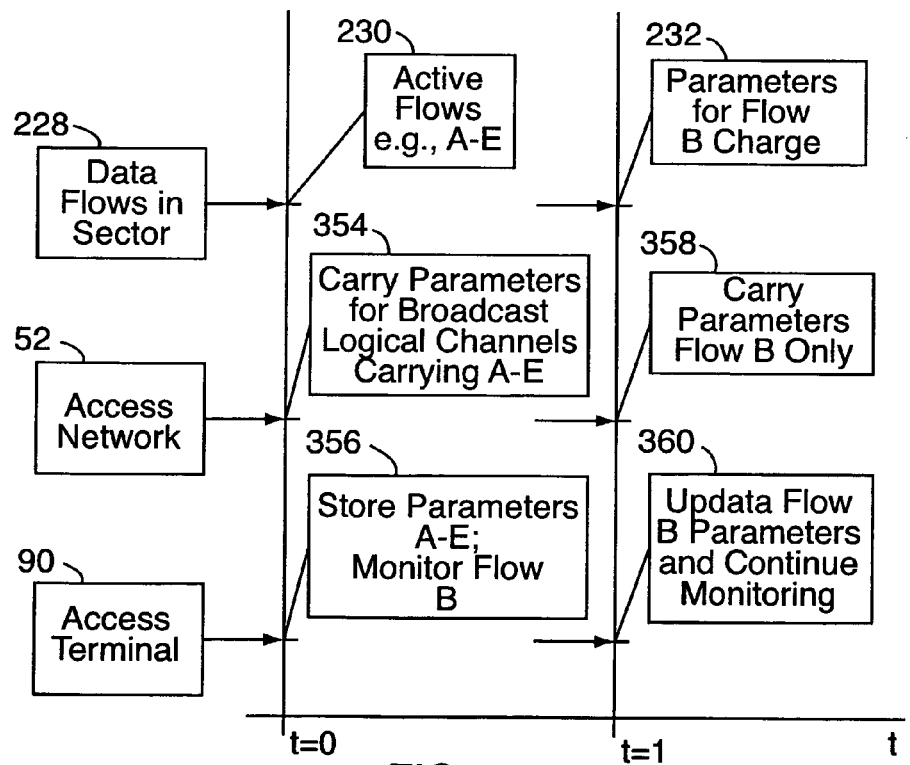
FIG. 13 is a schematic timing diagram showing the processing of broadcast overhead messages.

The processing of broadcast overheard messages is shown in FIG. 13 in relation to the access terminals 90, the access network 52, and the data flows 228 in a sector/cell of interest. The axis "t" represents the time in control channel cycles. At t=0, as an example, say there are five active flows "A"-"E" 230 in the sector. An access terminal 90 is interested in, e.g., flow B, and is attempting to acquire a BOM for the first time within the sector. At Step 354, the access network 52 carries a BOM in a synchronous control capsule containing parameters for the broadcast logical channels carrying flows A-E 230. At Step 356, the access terminal 90 receives the BOM and stores the parameters for flows A-E 230. The access terminal 90 also starts monitoring flow B. At time t=1, the parameters for flow B change (e.g., interlace-multiplex combinations), as at 232, while the parameters for flows A and C-E remain unchanged. As such, at Step 358, the access network 52 BOM carries parameters for flow B only. Then, at Step 360, the access terminal 90 updates the stored parameters for flow B, and takes appropriate actions to continue monitoring flow B. The parameters for the other flows remain unchanged.

In FIG. 13, it is assumed that the access network 52 can indicate a partial list of BCMC flows for which the schedule has changed in order to reduce overhead. The presence of a BCMCS flow identifier 80 within a BOM without any resource allocation is interpreted as the de-allocation of resources to that flow within the sector. If one or more desired BCMC flows are not indicated in the BOM, then the access terminal 90 may send an autonomous BCMCS flow registration message indicating a list of BCMC flows that it intends to monitor. Registrations may also be sent if explicitly solicited by the access network 52, e.g., through a "register for dynamic broadcast" field within a BOM. The conditions for performing registrations in response to solicitation by the access network 52 are described in the CDMA2000® High Rate Broadcast Multicast Air Interface standard. However, there is currently no control on autonomous registrations by the access terminal 90. While autonomous registration allows access terminals 90 to announce their presence and intent to monitor one or more flows within a sector, frequent registrations may excessively load the reverse link.

The group call system 50 may be configured for direct mode operation ("DMO") of the mobile stations 60a, 60b. DMO involves direct mobile-to-mobile communications that bypass network infrastructure, e.g., the radio access network 52. DMO, also known as "talkaround," may be a useful feature for the public safety community because natural disasters or power outages may disable the network infrastructure. It may also be useful for tactical in-building communications, because dead spots in buildings may make it impossible for mobile stations 60a to communicate directly with the network infrastructure. Finally, DMO may be used when first responders are called to remote locations where network infrastructure may not be deployed. DMO could be implemented by providing dual-mode handsets that use the 1x-EVDO network 52 for network-centric services and another technology, e.g., Project 25 or TETRA, for DMO.

For purposes of prolonging battery life, the access terminals 90 may be configured to remain in a unicast sleep mode while monitoring certain BCMCS flows, e.g., broadcast overhead messages for determining whether the desired BCMC flows carrying the broadcast speech bearer or media signaling have been scheduled.

As should be appreciated, an embodiment of the present invention may be characterized as a method of communicating with a plurality of wireless access terminals 60a, 60b over a wireless network 52. Here, the method would include assigning a push-to-talk floor to one of the access terminals, e.g., access terminal 60b, based on a message received from at least one of the access terminals. Typically, the message will be a floor request message received from the access terminal 60b whose user desires to speak to the call group. However, the floor may be assigned based on other received messages. Once the floor is assigned, data received from the access terminal 60b is transmitted to the other access terminals as a broadcast and/or multicast flow, in either case generally referring to same packet or other data stream (or copy thereof) transmitted from the radio access network 52 to a plurality of receivers (e.g., the other access terminals), and typically without a reverse link or signal/reception feedback or acknowledgement from the other access terminals. Typically, the broadcast and/or multicast flow will be a BCMCS flow. As noted above, a BCMCS flow is a packet data stream transmitted according to BCMCS protocols/procedures.

From the perspective of an access terminal 60b, an embodiment of the present invention may be characterized as method of communicating over a wireless network 52. Here, the access terminal 60b registers with the network for a standing call group that includes a plurality of access terminals 60a, 60b. Each access terminal 60a, 60b is provided with parameters for accessing a broadcast and/or multicast flow, and more typically a BCMCS flow. Subsequently, the access terminal 60b accesses the broadcast and/or multicast flow using the provided parameters, with the flow containing data (e.g., voice and other data) from one of the other access terminals granted a push-to-talk floor for communicating with the standing call group.

Since certain changes may be made in the above-described push-to-talk group call system using a CDMA 1x-EVDO cellular network, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method of communicating with a plurality of wireless access terminals over a wireless network, the method comprising:
assigning a floor to a first of said access terminals based on a message received from at least one of said access terminals;
transmitting parameters to the access terminals for commonly accessing at least one of a broadcast flow and a multicast flow, wherein the parameters include at least one security parameter; and
transmitting the at least one of the broadcast flow and the multicast flow to the access terminals other than the first access terminal, said flow comprising data received from the first access terminal.

2. The method of claim 1 further comprising:
the at least one of the broadcast flow and the multicast flow comprises a BCMCS flow;
transmitting unicast data in BCMCS slots to at least one of the access terminals; and
scheduling the BCMCS slots for the unicast data if no data is transmitted as the BCMCS flow.

3. The method of claim 1 wherein:
the parameters are transmitted as one or more broadcast overhead messages sent at a fastest allowable rate of the network.

4. The method of claim 1 further comprising:
transmitting at least one communication signaling message to one or more of the access terminals as the at least one of the broadcast flow and the multicast flow.

5. The method of claim 1 wherein:
communication resource allocations for the at least one of the broadcast flow and the multicast flow are maintained during periods when no data is being transmitted as the BCMCS flow.

6. The method of claim 1 further comprising, prior to the step of transmitting data received from the first access terminal to the other access terminals:
transmitting at least one control message indicating that the data is being transmitted as the at least one of the broadcast flow and the multicast flow.

7. A method of communicating over a wireless network comprising:
registering with the network a standing call group comprising a plurality of access terminals each provided with parameters for accessing at least one of a broadcast flow and a multicast flow, wherein the step of registering further comprises:
performing an application layer credential check;
accessing the at least one of the broadcast flow and the multicast flow based on the parameters, wherein the at least one of the broadcast flow and the multicast flow comprises data from one of said plurality of access terminals;
transmitting a floor request message to the network upon actuation of a pressel; and
transmitting the data to the network upon receipt of a floor assignment message, wherein the floor assignment message is received over the at least one of the broadcast and the multicast flow.

8. The method of claim 7 wherein:
the at least one of the broadcast flow and the multicast flow comprises at least one BCMCS flow having a BCMCS bearer flow and an associated BCMCS signaling flow, each having an associated BCMCS program identifier.

9. The method of claim 7 further comprising:
decoding broadcast overhead messages containing information about the at least one of the broadcast flow and the multicast flow.

10. A method of communicating with a plurality of wireless access terminals over a wireless network, the method comprising:
transmitting parameters to the access terminals for commonly accessing at least one of a broadcast flow and a multicast flow, wherein the parameters include at least one codec type;
granting a floor to the first access terminal based on a message from a first of said access terminals; and
transmitting data received from the first access terminal to the other access terminals over the at least one of the broadcast flow and the multicast flow.

11. The method of claim 10 further comprising:
the at least one of the broadcast flow and the multicast flow comprises a BCMCS flow;
transmitting unicast data in BCMCS slots to at least one of the access terminals; and
scheduling the BCMCS slots for the unicast data if no data is transmitted as the BCMCS flow.

12. The method of claim 10 wherein:
communication resource allocations for the at least one of the broadcast flow and the multicast flow are maintained during periods when no data is being transmitted as the broadcast flow or the multicast flow.

* * * * *